United States Patent [19]
Meyr et al.

[11] 3,804,517
[45] Apr. 16, 1974

[54] MEASUREMENT OF VELOCITY OF A BODY

[75] Inventors: Heini Meyr, Hinterkappelen; Rudolf Kühne, Berne, both of Switzerland

[73] Assignee: Haster AG, Berne, Switzerland

[22] Filed: May 1, 1972

[21] Appl. No.: 249,084

[30] Foreign Application Priority Data
May 4, 1971  Switzerland.......................... 6464/71

[52] U.S. Cl.................................. 356/28, 324/175
[51] Int. Cl. ............................................ G01p 3/36
[58] Field of Search .............. 324/175, 160; 356/28; 235/150.34

[56] References Cited
UNITED STATES PATENTS
3,689,157  9/1972  Andermo........................ 324/175 X

FOREIGN PATENTS OR APPLICATIONS
964,581  7/1964  Great Britain...................... 324/175

Primary Examiner—Alfred E. Smith
Assistant Examiner—Rolf Hille
Attorney, Agent, or Firm—Brady, O'Boyle & Gates

[57] ABSTRACT

An apparatus for a moving body and a method for measuring the velocity of that body over a surface arranged parallel thereto and which has local irregular features therein wherein two areas of the surface directly therebeneath are illuminated during movement of the body and optical reflection of the surface areas is received by two photo-electric converters, which are spaced from one another on the moving body and in the direction of motion of the moving body, and which produce two similar electrical signal sequences of the character of noise, but time delayed one with respect to the other. Both signals are sampled, the samples obtained from the leading surface area in the direction of motion is delayed by a controllable amount and thereafter multiplied by the samples obtained from the other surface area. A mean time value is produced from the result of this multiplication and the delay is regulated in such a manner that the delayed and the other signal coincide in time, and the velocity is ascertained as the quotient from the spacing of the two areas and the regulated delay.

11 Claims, 8 Drawing Figures

MEASUREMENT OF VELOCITY OF A BODY

The present invention relates to a method and a device for the measurement of the velocity of a body which is moved parallel to a surface that has a local irregular feature (e.g. an optical reflection coefficient). With this method two electrical signals are produced, each of which is altered correspondingly to the alterations of the feature at one of two points of the surface, which are moved together with the body and have an interval between one another in the direction of motion. The electrical signal obtained from the leading point in the direction of motion is delayed and thereafter multiplied by the electrical signal obtained from the other point. A mean time value is produced from the result of the multiplication (the product) and the delay is regulated in such a manner that the mean time value assumes a predetermined value indicating that the delayed and the other value coincide in time, and the velocity is the the quotient from the spacing of the two points and the regulated delay.

A measuring device which works according to this method is known from British Pat. specification No. 964,581. It contains two photo-electric converters for the conversion of the irregularities of the surface into corresponding electrical values which converters provide a voltage corresponding to the local reflection coefficient of the illuminated surface. A constantly rotating magnetic tape or a magnetic drum with a recording head and a pick-up head on the same track serve for the delay.

To alter the delay, either the spacing of the two heads or the speed of the magnetic information carrier is altered. When the running time of the magnetic information carrier between the said heads is equal to the running time of a point on the surface between the two photoelectric converter then a maximum signal results at the output of a low pass filter. A regulating device adjusts the working point of the equipment to this maximum with the help of a control circuit.

It is however preferable not to adjust to a maximum, but to a zero passage of the output signal at the low pass filter. To this end it was proposed in the Patent Specification referred to that the signal of the leading photo-electric converter should be delayed by two times slightly different one from the other, each of the two delayed signals should be multiplied by the signal of the trailing photo-electric converter, each product should be filtered by a low pass filter and the difference of the signals which occur at the output of the pass filters should be formed and the delay so adjusted that this difference becomes zero.

An object of the present invention is to provide a method that can be put into effect employing a delay unit without moving parts.

The method in accordance with the invention is characterised by the fact that two electrical impulse sequences of equal and variable frequency are produced, the amplitudes of which are altered correspondingly to the alterations of the feature or characteristic at any one of the points of the surface, that the impulse sequence obtained from the leading point is delayed by an amount inversely proportional to the frequency, thereafter the delayed impulse and the impulse of the other impulse sequence are multiplied together as a pair and the frequency of the impulse sequence is altered in such a way that the mean time value of the product assumes the predetermined value.

A device in accordance with the invention for putting the method into effect is characterised by a control circuit with a pulse generator of controllable frequency, a device controlled from the pulse generator for the production of the two electrical impulse sequences, a multi-stage delay register controlled from the pulse generator which delays the impulses derived from the leading point of the surface in the direction of movement, a multiplier circuit controlled from the pulse generator which receives at one input the impulses delayed by the register and at the other input the impulses derived from the trailing point in the direction of movement, a low pass filter for the depiction of a mean time value of the product and a frequency meter calibrated in units of velocity, whereby the pulse generator acts in a control circuit the sampler of which is the multiplication circuit with the low pass filter, the fixed member is the register, the control quantity is the mean value of which the fixed quantity is the frequency, and which is in the regulated state when the mean value has the predetermined value.

In this way the electro-mechanical delay unit of the known measuring device is replaced by a purely electronic delay unit. This is particularly advantageous when the velocity range to be measured is very great, as is for example the case in the measurement of speeds in railway operation, where the measuring device is attached to a locomotive, the surface moved relative to it being constituted by the rail, and where the speeds to be measured can vary between 5 and 200 kilometers per hour.

In order that the present invention be more readily understood, embodiments thereof will now be described, by way of example, with reference to the accompanying drawings, in which:

FIG. 8 shows a block diagram of a fragmentary part of a variant to FIG. 1.

Figure 1:
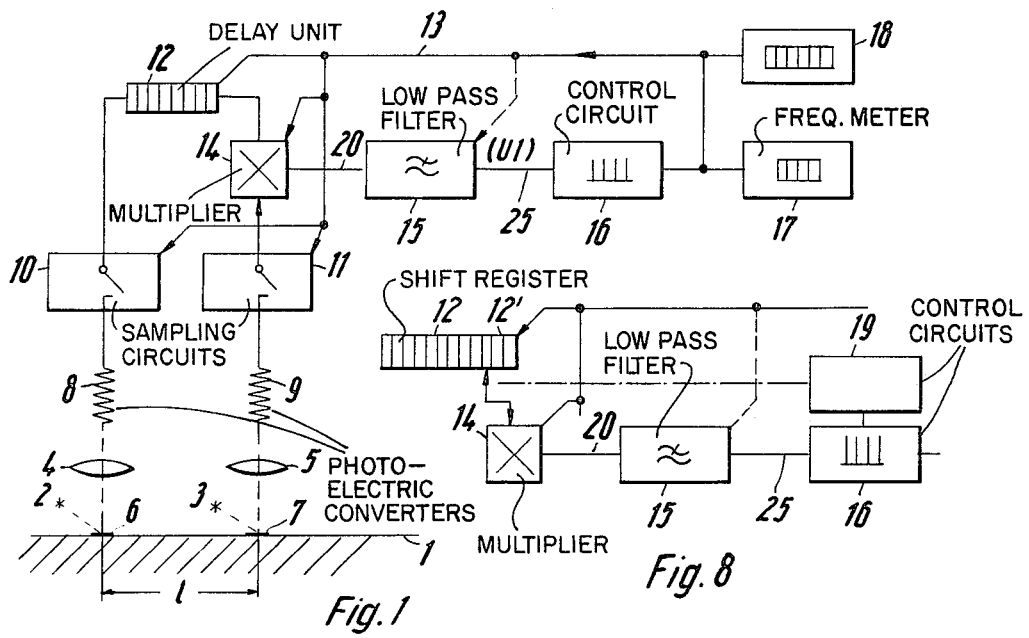
FIG. 1 shows a block diagram of a mreasuring device in accordance with the invention in which the measurement data are processed as analogue quantities.
Figure 2:
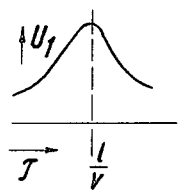
FIGS. 2 & 3 are graphic illustrations that show mean characteristics of the output voltage $U_1$ (relating to FIG. 1 and FIG. 6 respectively)

FIG. 1 shows a block diagram of a measuring device as it is provided for the measurement of the speed of a railway vehicle for example. Reference numeral 1 represents the surface of the rail, and the whole of the remaining apparatus is located on the vehicle and moves with this from right to left. Reference numerals 2 and 3 are light sources that illuminate the rail surface 1. Two illuminated points 6 and 7 are viewed by the optical systems 4 and 5 respectively, on the photo-electric converters 8 and 9 e.g. photodiodes respectively. Voltages of the character of noise result at the outputs of the photo-electric cells which are dependent upon the optical characteristics of the flat track sensed. The voltage at the outputs of the two photo-electric converters are thus approximately equal, but the voltage at the output of the trailing converter 9 lags by a time T which the vehicle takes in order to cover a path of distance $l$ equal to the spacing of the points 6 and 7. Reference numeral 12 represents a delay circuit which delays the signal originating from the output of a circuit 10 to be described in detail later by a time $\tau$. This time can be altered by a signal communicated across a lead 13. The values at the outputs of a circuit 11 to be described in detail later, and the circuit 12 are multiplied by each other in a multiplier 14. A value results at the output of the circuit 14 which is proportional to the product of the values at its two inputs and passes through a low pass filter 15 to a control circuit 16, to the output of which the lead 13 already mentioned is connected. If the circuits 10 and 11 are linear amplifiers with an amplification independent of the frequency as in the known device, then the values mentioned are represented by voltages and the voltage at the output of the low pass filter 15 follows the cross correlation function of the voltage of the photo-electric converter 9 and of the voltage delayed by the delay circuit 12 of the photo-electric converter 8. This function is shown in FIG. 2 for a given speed of the device relative to the surface. The delay time $\tau$ constitutes the abscissa, and the mean voltage at the output of the low pass filter 15 is the ordinate. This function then has a maximum when the delay time $\tau$ provided by the delay circuit 12 is equal to the running time T of the measuring device for the distance $l$ between the points 6 and 7. The control circuit is so constituted that it adjusts the delay to this value T. Then the delay time $\tau$ is also a measure for the speed of the vehicle $\tau = T = l/v$, where v is the velocity of the device.

In the device in accordance with the invention, instead of continuous functions at the input of the multiplier there are discrete values which are obtained by sampling the outputs of the photo-electric converters at a frequency f. This sampling is effected by the circuits 10 and 11, which contain electronic switches. Sampling circuits or switches of this kind are well known in time multiplication technology.

The control unit 16 contains a pulse generator which generates an impulse sequence of variable frequency. The train of impulses controls the sampling switches of the circuits 10 and 11, the delay unit 12, the multiplier 14, and can also control the low pass filter 15. The frequency of the pulse generator is so adjusted by the arrangement that it is proportional to the speed of the device. By this means the speed can be indicated through a frequency meter 17, which supplies a direct value in km/h.

Since in the adjusted condition the frequency is proportional to the speed, the spacing of the points on the surface which correspond to consecutive sampling instants is constant and independent of the speed. The condition generally exists, that before sampling, the highest frequency component contained in the voltage to be sampled must be limited to half the sampling frequency, in order to avoid the occurrence of image frequencies. Since in the arrangement described the sampling frequency is variable, a frequency limitation by electrical means is not possible in a simple way. It could be obtained by optical measures through an appropriate selection of the gap width, but no frequency band limitation is necessary for the evaluation of the correlation.

The electrical values referred to can be represented either by amplitude modulated impulses or by binary code combinations which are obtained in a known manner by analogue/digital conversion from the amplitude-modulated impulses.

When the values are represented by amplitude-modulated impulses, 10 and 11, are simple sampling switches, and 12 is a register for analogue values which, controlled by an impulse from the lead 13, are stored in storage units and after a given number of impulses are passed on to the multiplier 14. The output of the sampling switch 11 is directly connected to the other input of the multiplier 14. The multiplier 14 is then a four-quadrant multiplier of a known type.

Since the spacing of the impulses can vary over a very wide range, it is advantageous to use a low pass filter for discrete values controlled by the impulses occuring in the lead 13 for the filter 15. Such a low pass filter is illustrated in the block circuit diagram of FIG. 4. It has an input 20 at which the discrete values $Z_k$ occur, in which Z represents the amplitude of the voltage impulse and k its order number. It passes through a subtraction circuit 21, an attenuator 22 which multiplies the value by an amount $p<1$, an addition circuit 23 from the output of which the value $S_k$ emerges and to which the output of the low pass filter is connected, in which value S represents the amplitude of the impulse and $k$ is its order number. A delay circuit 24 is connected to the output which under the control of the impulses on the lead 13 delays the value $S_k$ by the time $T_a$. This delayed value is led to the second input of the circuit 23 and to the subtraction input of the circuit 21. Accordingly the output signal $S_k$ of the low pass filter satisfies the following equation:

$$S_k = p \cdot (Z_k - S_{k-1}) + S_{k-1}.$$

$T_a$ is equal to the spacing between two impulses on the lead 13, thus $T_a = 1/f$.

When $p$ is small, for example about 0.1, then the output signal consists of nine-tenths of the preceding output signal $S_{k-1}$ and of one-tenth of the new input signal $Z_k$. Consequently the output signal only follows alterations of the input signal slowly, so that the circuit acts as a low pass filter. The smaller $p$ is, the more accurate is the mean value representation, but the slower is the matching to changing speeds. Consequently $p$ should be chosen according to the maximum acceleration $dv/dt$ which occurs.

Figure 5:
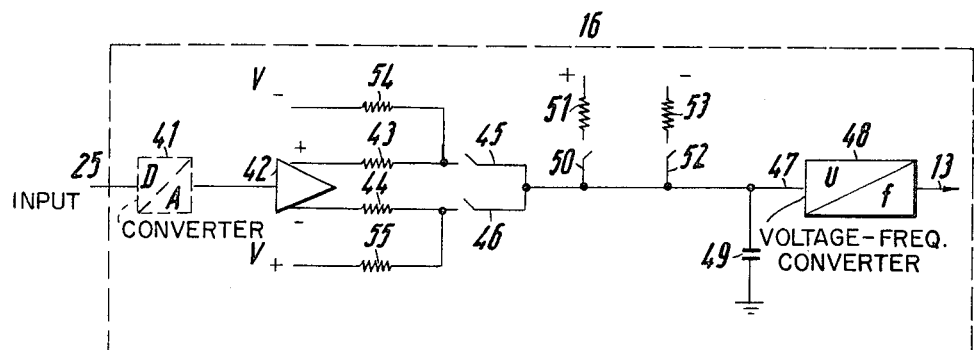
FIG. 5 is an electrical schematic diagram showing the circuitry of the central unit block of FIG. 1.

As already explained, the value at the output of the low pass filter 15 is a maximum when the frequency is so adjusted that the delay $\tau$ of a value in the register 12 is equal to the running time $T = 1/v$. The control device 16, which contains the frequency generator must thus so adjust the frequency that this condition is satisfied, and is consequently what is known as a maximum-seeking controller. Such a unit is shown diagrammatically in FIG. 5. Its input is connected to the output 25 of the low pass filter and linked with the input of an amplifier 42, which has one inverted and one non-inverted output. The outputs are connected with the input 47 of a voltage-frequency converter 48 across two resistances 43 and 44 and two switches 45 and 46. The converter has a very high input resistance since its input is linked to ground across a condenser 49. It generates a continuous sequence of short impulses to the lead 13, the frequency of which is at least approximately proportional to the voltage at the input 47. A precise proportionality is not required. The input 47 is also connected across the switch 50 and the resistance 51 with a positive voltage source and across the switch 52 and the resistance 53 with a negative voltage source. For the search for the maximum, the output frequency is displaced with a slow frequency, first to a rather higher and then back to a rather lower frequency, and adjusted in the opposite direction in accordance with the values thereby obtaining at the output of the low pass fiter. It this is done on the falling part of the curve, then the magnitudes of the adjustment are different in the two directions, in such a way that a total adjustment results in a displacement to the maximum.

The search for the maximum is carried out in the manner that first the switch 50 is closed for a short, precisely fixed period, through which the voltage at the point 47 is raised by a certain amount. Thereupon the switch 45 is closed, and the output of the amplifier is sampled and a displacement towards the opposite side takes place, since the output voltage at the amplifier can at the most be equal to the voltage V- present at the resistance 54. Thereafter the switch 52 is closed for a short period and after that the switch 46, which via the resistance 44 samples the negative output of the amplifier 42. One of the switch contacts is connected with a positive voltage source V+across the resitance 55.

When the values mentioned are represented by combinations of binary symbols, then the sampling switches 10 and 11 each contain one analogue/digital converter, of the type known from PCM devices. The individual bits of the combinations can occur simultaneously (parallel) or one after another (in series). Circuit 12 then is a memory or shift register in which the values held at the output of the circuit 10 are stored. For that purpose, each staq of the shift register has as many cells as the binary expression of the value has places. The values are passed through the shaft register under control of the impulses from the lead 13 until they emerge at the output of the shift register and are passed on to the digital multiplier 14. This carries out a digital multiplication and passes on the result to low pass filter 15.

Figure 3:
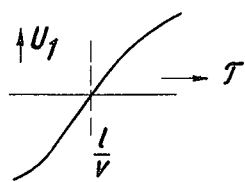
Figure 4:
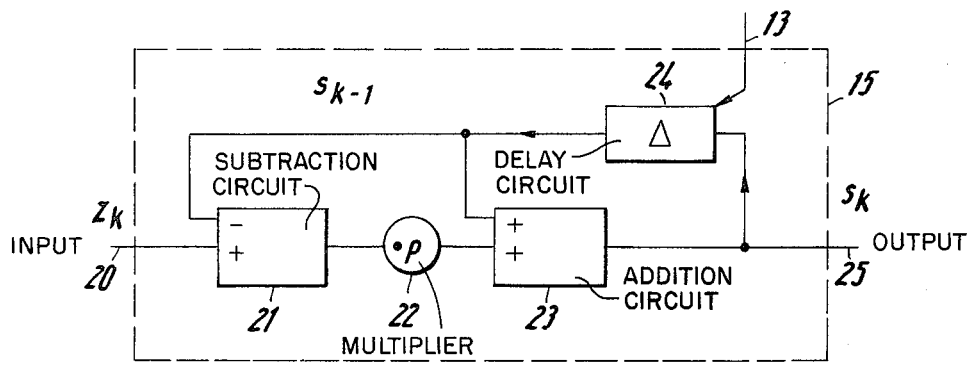
FIG. 4 shows a block diagram of the low pass filter contained in FIG. 1.
Figure 6:
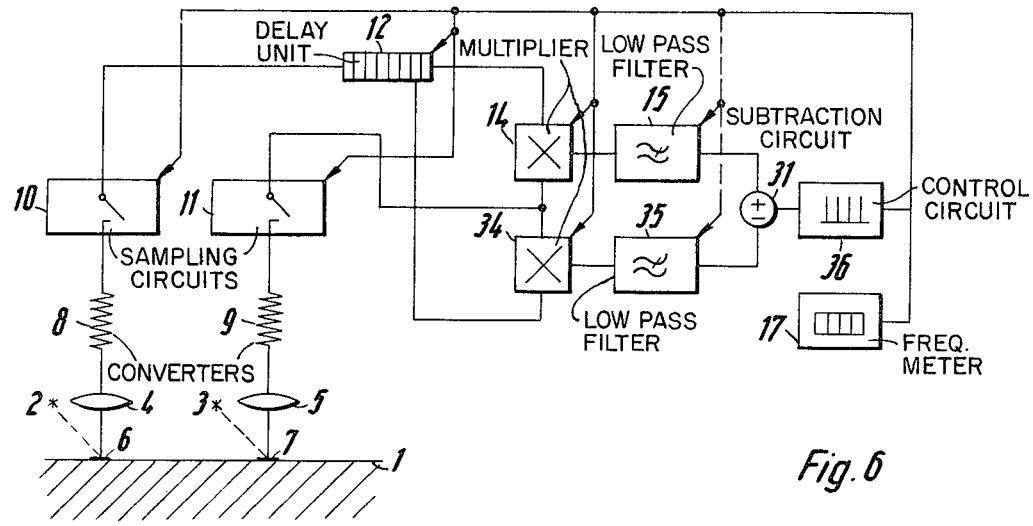
FIG. 6 is a schematic block diagram of another embodiment of the measuring device of the invention.
Figure 7:
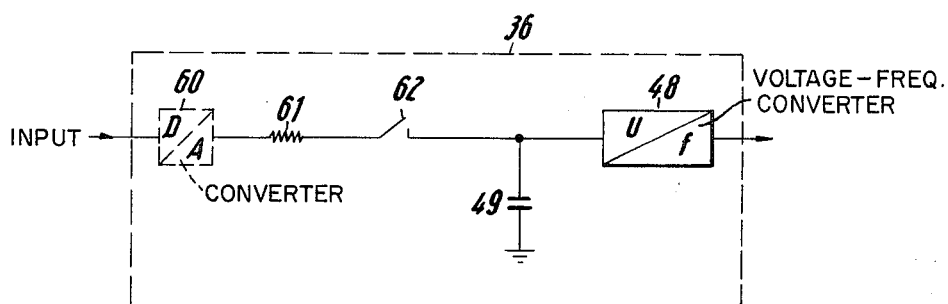
FIG. 7 is an electrical schematic diagram of the circuitry of the control unit of FIG. 6.

The circuit of FIG. 4 is then also a digital circuit. The circuit 21 is then a digital subtraction circuit, the circuit 23 an addition circuit, the circuit 22 a multiplication circuit, which in the simplest case effects a shift operation, the delay circuit 24 a flip-flop which executes a delay for a cycle time $T_a$. The circuit of FIG. 5 remains unaltered, with the single exception that a digital/analogue converter 41 which converts the digital output of the filter 15 into an analogue signal is interposed berween the input 25 and the amplifier 42. The circuit of FIG. 6 avoids the complicated maximum-seeking control circuit, in that it gives two outputs with different delays to the delay circuit 12, which are connected to the two multipliers 14 and 34, the other inputs of which are linked with the output of the circuit 11. At the outputs of the multipliers are the low pass filters 15 and 35, the outputs of which are connected with the inputs of a subtraction circuit 31. Their output signal controls the control circuit 36. If the mean value of the delay times up to the last and penultimate steps of the shift register 12 is equal to $\tau$, then the value at the output of the subtraction circuit 31 passes through zero (FIG. 3) whereupon the control circuit must be adjusted to zero voltage at this input. In FIG. 3 the mean output value $U_1$ is plotted versus the delay for a given velocity $v$. As in FIG. 1, it is possible for the individual blocks to work either with amplitude-modulated impulses or with binary coded values. FIG. 7 shows a block diagram of the control circuit 36. In this circuit the output of the subtraction circuit 31 is connected across a resistance 61 and a switch 62 with the input of the voltage-frequency converter 48, to the high impedance input of which the condenser 49 is connected.

On the appearance of every single value at the output of the subtraction circuit 31 the switch 62 is briefly closed and thus displaces the voltage at the condenser 49 and so the frequency of the voltage-frequency converter 48 in a positive or negative direction, in such a way that the mean value at the input of the control circuit passes to zero. If the values are represented by binary code combinations, then again there is a digital/analogue converter 60 between the output of the subtraction circuit 31 and the input of the control circuit 36.

Since the voltages at the output of the converters 8 and 9 are only used during the sampling instant, it is not necessary for the surface 1 to be continuously lit. It suffices to illuminate this during sensing through light flashes, which is advantageous with the use of semiconductor light sources.

The measurement range of the device described is limited in the direction of low speeds, for the following reasons: $T = l/v$ is the time taken to pass through the distance $l$ between the two sensing points at the speed $v$. If the rapidity of the alteration of this time in relation to the speed and acceleration is calculated, there results:

$$dT/dt = 1-a/v^2$$

in which $a$ is the acceleration. From this it results that with low speeds large values can be assumed for the alteration velocity of the running time between the two points. The control circuit must be able to follow these alterations. Now the shift register controlled through a variable impulse frequency is an adjusting element that has a setting time which is equal to the running time of the shift register. If the shift register has $n$ stages and the passage time of a value through the shift register is changed from $\tau$ to $\tau+\Delta\tau$, then the delay for the first value which is received at the output of the shift register after the change is $\tau+\Delta\tau/n$, for the second $\tau+2\Delta\tau/n$ and for the final value, that is the value which went into the input of the shift register on switching over, the delay amounts to $\tau+(n\Delta\tau/n) = \tau+\Delta\tau$. This setting time is thus equal to the time T, which is very great at low speeds. The danger is thus present that with small velocities the control circuit cannot follow the alterations. If however $\Delta\tau$ is adjusted to a greater value than is necessary, then the necessary value is reached more quickly, but the alteration goes on beyond the necessary value and undesired control oscillations result.

With one form of embodiment of the device in accordance with the invention the pulse generator has a lower limit frequency which corresponds to a certain lower limit of velocity. In this arrangement the shift register 12 (FIG. 8) has additional stages 12' at its rear end, and an additional control circuit 19 is provided, which at velocities below the limit velocity switches in so many additional stages of the shift register that the delay of the shift register inclusive of the additional stages is equal to the time required at any time to pass through the distance between the two points on the surface.

With the method described and the device described it is possible for the measuring device to be fixed and the surface, for example the surface of a material track, in particular rolled goods, to be moving. Conversely the body can be moved, for example be a vehicle with a speedometer, and the surface remain still, for example the running surface of a railway, or be a surface along which a vehicle runs with or without wheels, for example a hover-vehicle or craft.

We claim:

1. A method for measuring the speed of a body moving parallel to a surface that has local irregularities, comprising scanning the surface at a first and second area thereof and thereby producing a first and a second signal corresponding to the local irregularities of said first and second area respectively, said first and second areas moving together with said body, and said first area preceding the second area by a predetermined distance in the direction of movement of said body;

periodically sampling said first and second signals, thereby obtaining first and second samples respectively;

delaying said first samples by a constant whole number of sampling periods;

multiplying each delayed first sample by the simultaneously appearing second sample, thereby providing a sequence of sample products;

continuously deriving an average value of said sequence of sample products;

regulating the period of sampling so that said average value will become maximum; and dividing said predetermined distance by the product of said constant whole number and the period of said periodic sampling to provide the speed of the body.

2. A method for measuring the speed of a body moving parallel to a surface that has local irregularities, comprising scanning the surface at a first and second area thereof and thereby producing a first and a second signal corresponding to the local irregularities of said first and second area respectively, said first and second areas moving together with said body, said first area preceding the second area by a predetermined distance in the direction of movement of said body;

periodically sampling said first and second signals, thereby obtaining first and second samples respectively;

delaying said first samples by a first constant whole number of sampling periods and by a second constant whole number of sampling periods, thereby obtaining first and second delayed samples, said second number being higher than said first number;

multiplying each of said first delayed samples and each of said second delayed samples with the simultaneously appearing second sample thereby providing a first and a second sequence of sample products respectively;

continuously deriving a first average value of said first sequence of sample products, and continuously deriving a second average value of said second sequence of sample products;

continuously deriving the difference between said first and second values;

regulating the period of sampling so that said difference will become zero; and dividing said predetermined distance by the product of the mean value of said first and second constant whole numbers and the period of said periodical sampling to provide the speed of the body.

3. A device for measuring the speed of a body moving parallel to a surface that has local irregularities, comprising scanning means fixed to said body and having a first and a second output delivering a first and a second signal corresponding to the local irregularities of a first and second area respectively of said surface, the first area preceding the second area by a predetermined distance in the direction of movement of said body;

sampling means having a first and a second input connected to said first and second outputs of said scanning means respectively, and having a first and a second output delivering first and second samples derived by periodically sampling said first and second signals respectively;

a shift register having an input connected to the first output of said sampling means and having an output delivering signals derived from said first samples by delaying them by a constant whole number of sampling periods;

a multiplier having two inputs, one connected to the second output of said sampling means and the other connected to the output of said shift register, and having an output;

a low pass filter having an input connected to the output of said multiplier and having an output;

a control circuit having an input connected to the output of said low pass filter, said control circuit connected to deliver periodic control pulses to said sampling means, said shift register and said multiplier, the frequency of said control pulses being so regulated that the value of the output signal of the low pass filter becomes a maximum; and indicating means connected to said control circuit to receive said control pulses and responsive to the frequency thereof and calibrated in units of speed.

4. A device as set forth in claim 3, wherein said low pass filter is a pulsed filter for discrete samples and is connected for control by said control pulses.

5. A device as set forth in claim 3, wherein said sampling means at its first and second outputs are adapted to deliver coded samples derived by periodically sampling and coding said first and second signals respectively, and said shift register, multiplier and low pass filter are adapted to shift, multiply and filter coded signals.

6. A device as set forth in claim 3 wherein light pulse generating means for illuminating the first and second areas of the surface are included in said scanning means, said light pulse generating means being connected to said control circuit for control by said control pulses.

7. A device for measuring the speed of a body moving parallel to a surface that has local irregularities, comprising scanning means fixed to said body and having a first and a second output delivering a first and a second signal corresponding to the local irregularities of a first and a second area respectively of the surface, the first area preceding the second area by a predetermined distance in the direction of movement of said body;

sampling means having a first and a second input connected to said first and second output of said scanning means respectively, and having a first and a second output delivering first and second samples derived by periodically scanning said first and second signals respectively;

a shift register having a plurality of stages and having an input connected to the first output of said sampling means and having a first output at its penultimate stage and a second output at its last stage;

a first multiplier having a first input connected to the first output of said shift register, a second input connected to the second output of said sampling means and an output;

a second multiplier having a first input connected to the second output of said sampling means, a second input connected to the second output of said shift register and an output;

two low pass filters each having an input connected to the output of one of said first and second multipliers respectively and each having an output;

a subtraction circuit having two inputs each connected to the output of one of said two low pass filters and an output;

a control circuit having an output connected to the output of said substaction circuit, said control circuit connected to deliver periodic control pulses to said first and second sampling means, said shift register, and said first and second multipliers, the frequency of said control pulses being so regulated that the output signal of said substaction circuit becomes zero; and indicating means connected to said control circuit to receive said control pulses and responsive to the frequency thereof and calibrated in units of speed.

8. A device as set forth in claim 7, wherein each of said low pass filters is a pulsed filter for discrete samples and is connected for control by said control pulses.

9. A device as set forth in claim 7, wherein said sampling means at its first and second outputs are adapted to deliver coded samples derived by periodically sampling and coding said first and second signals respectively, and said shift register, multipliers and low pass filter are adapted to shift, multiply and filter coded signals.

10. A device as set forth in claim 7, wherein light pulse generating means for illuminating the first and second areas of the surface are included in said scanning means, said light pulse generating means being connected to said control circuit for control by said control pulses.

11. A device for measuring the speed of a body moving parallel to a surface that has local irregularities, comprising scanning means fixed to said body and having a first and a second output delivering a first and a second signal corresponding to the local irregularities of a first and second area respectively of the surface, the first area preceding the second area by a predetermined distance in the direction of movement of said body;

sampling means having a first and a second input connected to said first and second output of said scanning means respectively and having a first and a second output delivering first and second samples derived by periodically sampling said first and second signals respectively;

a shift register having an input connected to the first output of said sampling means and having an output connectable to one of a plurality of consecutive register stages which is selected by a control signal;

a multiplier having two inputs, one connected to the second output of said sampling means and the other connected to the output of the shift register and having an output;

a low pass filter having an input connected to the output of the multiplier and having an output;

control means having an input connected to the output of said low pass filter, said control means connected to deliver periodic control pulses to said sampling means, said shift register and said multiplier and connected to deliver said control signal to select said one of said plurality of register stages, said control signal being so regulated that the value of the output signal of the low pass filter becomes a maximum; and indicating means connected to said control circuit and responsive to said control signal and calibrated in units of speed.

* * * * *

UNITED STATES PATENT OFFICE
CERTIFICATE OF CORRECTION

Patent No. 3,804,517    Dated April 16, 1974

Inventor(s) Heini Meyr and Rudolf Kühne

It is certified that error appears in the above-identified patent and that said Letters Patent are hereby corrected as shown below:

In the heading, correct the spelling of the name of the Assignee from "HASTER AG" to -- HASLER AG --.

Signed and sealed this 1st day of October 1974.

(SEAL)
Attest:

McCOY M. GIBSON JR.
Attesting Officer

C. MARSHALL DANN
Commissioner of Patents